June 12, 1928.
W. L. FAIRCHILD
1,673,352
VULCANIZING APPARATUS FOR PNEUMATIC TUBES AND THE LIKE
Filed Dec. 11, 1925    3 Sheets-Sheet 1
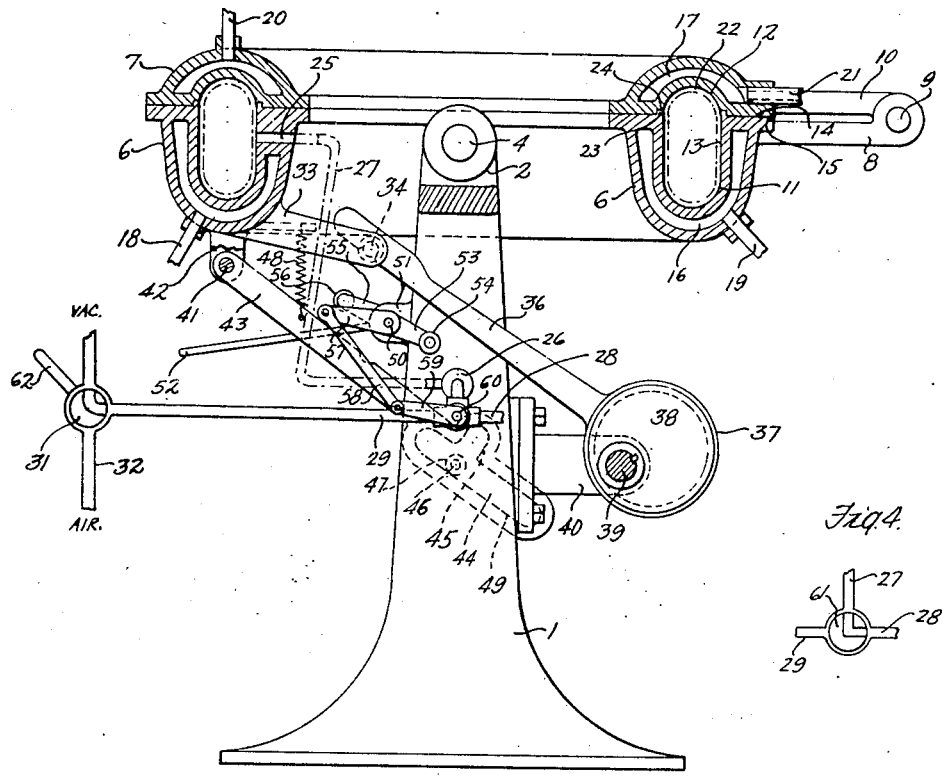
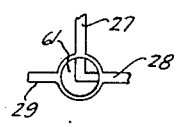
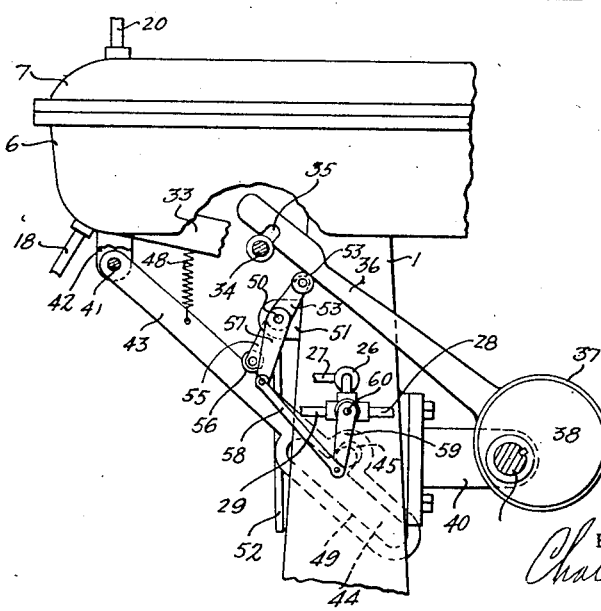
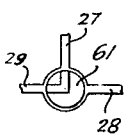
INVENTOR
WALTER L. FAIRCHILD
BY
ATTORNEY June 12, 1928.
W. L. FAIRCHILD
1,673,352
VULCANIZING APPARATUS FOR PNEUMATIC TUBES AND THE LIKE
Filed Dec. 11, 1925    3 Sheets-Sheet 2
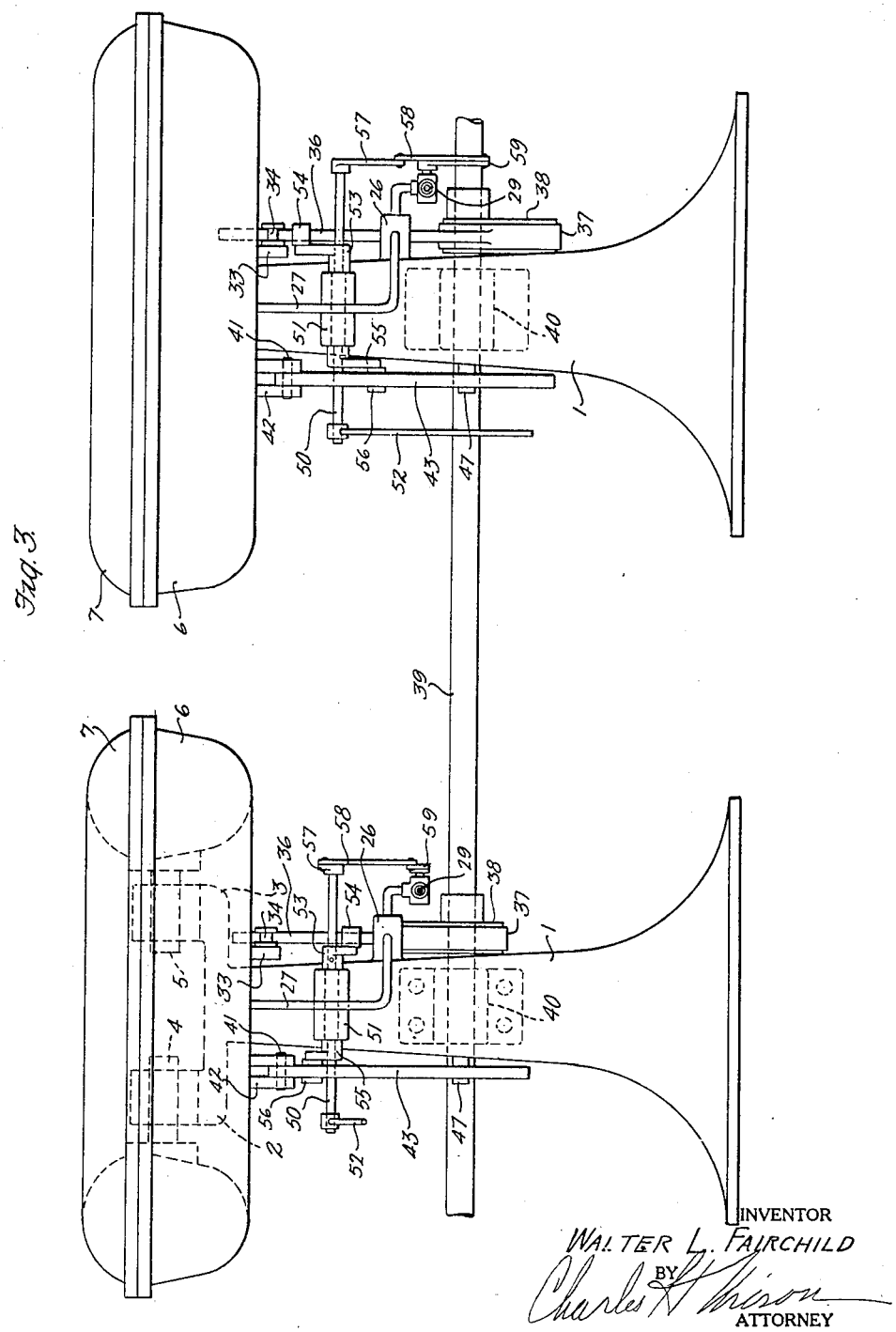
INVENTOR
WALTER L. FAIRCHILD
BY
Charles H. Thisou
ATTORNEY June 12, 1928.
W. L. FAIRCHILD
1,673,352
VULCANIZING APPARATUS FOR PNEUMATIC TUBES AND THE LIKE
Filed Dec. 11, 1925   3 Sheets-Sheet 3
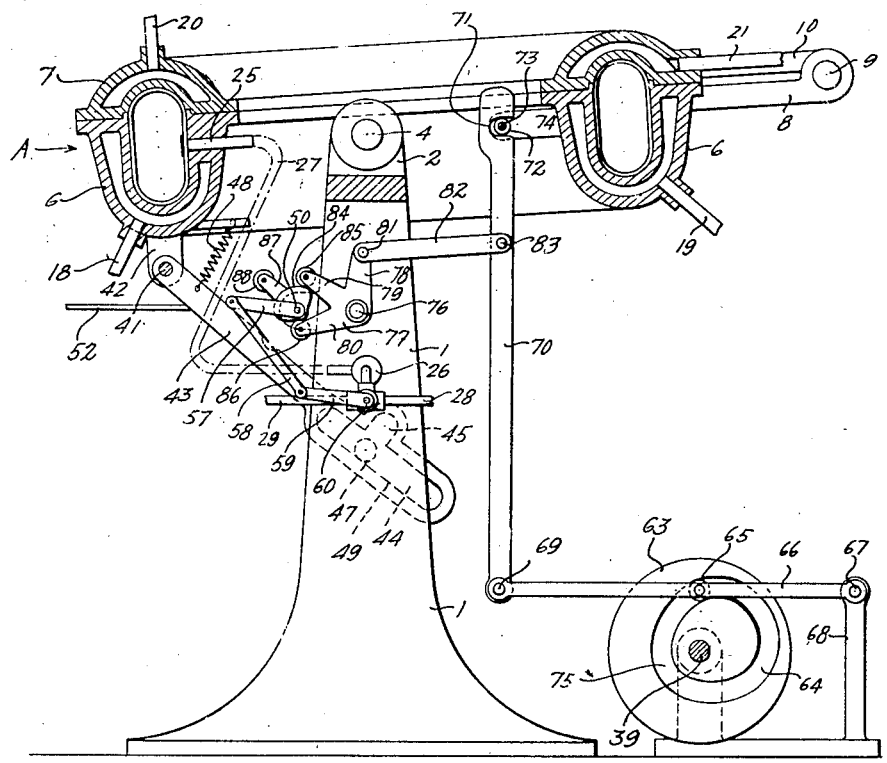
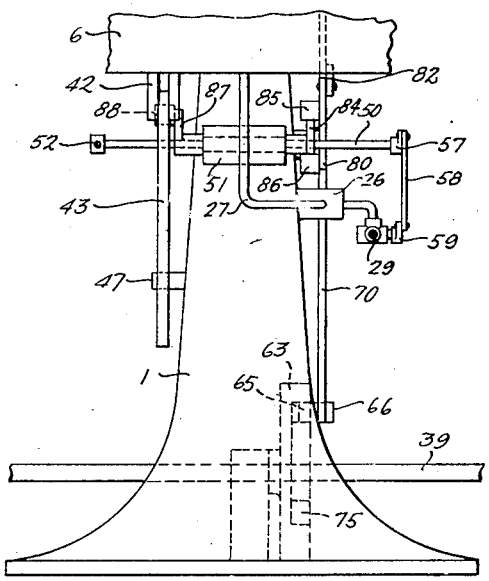
INVENTOR
WALTER L. FAIRCHILD
BY
ATTORNEY Patented June 12, 1928.

1,673,352

UNITED STATES PATENT OFFICE.

WALTER L. FAIRCHILD, OF NEW YORK, N. Y.

VULCANIZING APPARATUS FOR PNEUMATIC TUBES AND THE LIKE.

Application filed December 11, 1925. Serial No. 74,710.

This invention relates to new and improved vulcanizing apparatus for pneumatic tubes for vehicle tires and other hollow articles formed of vulcanized raw rubber compound. The method disclosed but not claimed herein, is claimed in my co-pending application Serial No. 104,423, filed April 24, 1926.

One of the objects of the invention is to provide apparatus of the above character wherein live steam is utilized within the tube or other article being vulcanized, such that all portions of the article being subjected to the vulcanizing process will be evenly treated thereby providing a vulcanized article of uniform texture.

Another object of the invention is to provide apparatus af the above character employing live steam within the hollow article being vulcanized as a vulcanizing medium wherein water of condensation is not permitted to collect in any regional part of said article being subjected to the vulcanizing process, whereby that surface of said article would not receive the same vulcanizing treatment as would other portions thereof remaining out of contact with said water of condensation.

More particularly my invention contemplates the provision in vulcanizing apparatus of the above type of means adapted to maintain a constant motion of the hollow article being vulcanized, whereby water of condensation is not permitted to collect in any one part of said article while the latter is being subjected to said vulcanizing operation.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings wherein I have illustrated preferred forms of embodiments of my invention, Figure 1 is a view partly in elevation and partly in vertical section showing one embodiment of my invention;

Figure 2 is a view similar to Figure 1 partly broken away, however, showing the parts in a different position;

Figure 3 is an elevational view of my improved apparatus showing the manner in which several vulcanizing units may be driven from a single operating shaft;

Figure 4 is a vertical sectional view taken through part of the mechanism employed for controlling the supply of gases to the article to be vulcanized.

Figure 5 is a view similar to Figure 4, but showing the parts in a different position.

Figure 6 is a view partly in side elevation and partly in vertical section showing a different embodiment of my invention; and Figure 7 is a rear elevational view of the embodiment of my invention shown in Figure 6.

Similar reference characters refer to similar parts throughout the several views of the drawings.

Before proceeding to describe in detail the construction of the mechanism adapted for carrying out the present invention, it may here be noted that in the vulcanizing of pneumatic tubes and the like in individual molds wherein a gas such as steam has been utilized within the article to be vulcanized as a vulcanizing medium and also as a medium to maintain the article expanded within the mold, difficulty has been experienced in obtaining a uniformly vulcanized article by reason of the fact that water of condensation collecting in the lowermost portion of said article being vulcanized has a tendency to obstruct or interfere with the vulcanizing operation upon that part of the article covered by said water of condensation, the result being that the wall of the article is not uniformly vulcanized,—that is to say, uniform vulcanization of the entire wall of a pneumatic tube or similar article cannot be had while water of condensation is allowed to collect and lie in a regional part of the article being vulcanized. I have, therefore, provided an apparatus whereby the article to be vulcanized is kept in constant motion so that water of condensation is not allowed to collect or remain stationary within the article being vulcanized, with the resultant effect of a uniformly vulcanized article.

Proceeding now to a description of the mechanism constituting the embodiment of my invention illustrated in the drawings, the reference numeral 1 denotes the standard or support of the mold, the said standard at its upper end being provided with spaced arms 2 and 3, in which are journaled the pintles 4 and 5 respectively of the mold. The mold, which is denoted generally by the reference letter A, (Fig. 6) consists of two circular sections 6 and 7, the lower mold section 6 having a laterally extending arm 8, to which is pivoted at 9, an arm 10 of the upper section 7, the construction being such that said upper section 7 may be swung upwardly and rearwardly with respect to the lower section 6. The pintles 4 and 5 which are supported in the arms 2 and 3 of the standard 1 extend laterally in an inwardly direction from the lower section 6 of the mold, the construction being such that the mold as a unit may be rocked upon its horizontal axis in the bearings formed in the arms 2 and 3 of the standard 1.

The lower section 6 of the mold is provided with a vulcanizing channel 11 preferably of semi-oval cross sectional form, and the upper section is likewise provided with a vulcanizing channel 12 preferably semicircular in cross section; the contour of said channels being such that when the mold sections are disposed in mating relation as shown in Figure 1 of the drawings, a vulcanizing chamber 13 will be formed of substantially elliptical cross section.

The meeting faces 14 and 15 of the mold sections are, of course, ground to a nicety, so that the upper section is positioned upon its mating lower section and a substantially perfect union will be formed between the mating edges of the vulcanizing surfaces of the respective mold sections.

The mold sections are adapted to be independently heated, preferably steam heated, a circular steam chamber 16 surrounding the vulcanizing channel of the lower mold and a circular steam chamber 17 surrounding the vulcanizing chamber of the upper mold. Leading into the steam chamber 16 of the lower mold section is an intake pipe 18 and leading therefrom at the diametrically opposite side of the mold section, is the exhaust pipe 19. The steam chamber of the upper mold section 7 is provided with an intake pipe 20 and the exhaust pipe 21; the disposition of the exhaust pipes 19 and 21 being such that when the mold as a unit is tilted to its rearmost position as will be hereinafter described, any water of condensation which may be present in the steam chambers 16 and 17 will be discharged therefrom.

While the means for supplying the heating medium to the mold sections, are not shown in the present drawings, it will be understood that they will be connected with a suitable source of live steam supply, it being the intention to at all times supply such quantity of live steam to said mold sections as will maintain them at a predetermined temperature, that is to say, at such a temperature as will effect a vulcanizing operation on the rubber compound of which the article to be vulcanized is composed.

Located in the vulcanizing chamber formed by the channels 11 and 12 of the respective mold sections, is a tube 22 preferably formed of a raw rubber compound, said tube being shown expanded into engagement with the vulcanizing surface of the vulcanizing chamber ready to be subjected to the vulcanizing operation.

The mold sections when disposed in mating relation are adapted to be locked together, whereby a complete closure of the vulcanizing chamber is established during the vulcanizing operation, the locking means being sufficient to hold said mating sections in engagement against the internal pressure exerted upon the tube being vulcanized. This locking means is not shown in the present drawings. I have preferably employed a locking means, such as is disclosed in my United States Patent No. 1,606,352, dated November 9, 1926, although, of course, any approved means may be employed for locking the mold sections together, without departing from the spirit of the present invention.

In order to facilitate the production of a substantially perfect closure between the mold sections, and to hold the registering vulcanizing surfaces of the upper and lower mold sections in perfect registry, I preferably form upon the lower section a pair of circular bosses 23 which fit to a nicety within the correspondingly shaped recesses 24 formed in the upper mold section.

The tube 22 which is to be subjected to the vulcanizing operation has been equipped with a valve stem before its introduction into the mold, said valve stem, indicated at 25, extending laterally and inwardly through the wall of the lower mold section as clearly indicated in Figures 1 and 6. Suitable means, not shown, are provided for effecting a tight closure for this valve stem through the wall of the lower mold section; a means particularly well adapted to attain this object being shown in my pending application Serial Number 54,054, filed September 2, 1925. Leading from a three-way valve 26 to the valve stem 25 is a flexible conduit 27, sufficient slack being provided in said flexible conduit to permit the mold unit to be rocked upon its pivotal support as will hereinafter be described.

The reference numeral 28 denotes a pipe adapted to conduct through the three-way valve 26 to the conduit 27, the vulcanizing medium which, in the present instance, is steam under suitable pressure, to maintain a temperature within the tube to be vulcanized substantially equal to the temperature at which the mold sections are maintained during the vulcanizing operation.

The live steam is delivered to the pipe 28 from any suitable source of supply (not shown). Leading from the three-way valve 26 is a pipe 29 which leads to the three-way valve 31. The valve 31 is adapted to be connected with a source of suction or vacuum, as by means of the pipe 32 and also with a source of fluid pressure, such for instance, as air or other gas, for a purpose hereinafter to be described.

Extending laterally inwardly from the lower mold section 6 is an arm 33 provided with a laterally extending pin or roller 34 which is adapted to be received in a slot 35 provided in the upper end of a rod 36 extending from the housing 37 of the eccentric 38 which is carried on a shaft 39 journaled in a bracket 40 clamped to the standard 1. The shaft 39 is adapted to be constantly driven, the construction being such that when the pin 34 is received in the slot or recess 35 of the rod 36, the eccentric 38 will, through said rod 36 and the arm 33, cause a rocking movement of the mold assembly upon its pivotal support.

Pivotally mounted at 41 upon a boss 42 depending from the lower section 6 of the mold, is a rod 43, the lower end of which is provided with a longitudinally extending slot 44, the said slotted end portion of the rod 43 being provided with a laterally extending recess 45, and extending into said slot is a pin 46 provided with a roller 47. The rod 43 is held normally in the position shown in Figure 1 of the drawings, as by means of the retractile spring 48, so that during the rocking movement of the mold as above described, the roller 47 will engage with the straight surface 49 of the slot 44. It will be seen, however, that when the rod 43 is swung downwardly upon its point of pivotal support and the walls of the recess 45 caused to embrace the roller 47, the rod 43 will serve to lock the mold assembly in the position shown in Figure 1 of the drawings. Of course, before this locking operation is effected, it is necessary to disengage the walls of the recess 35 of the rod 36 from the pin 34, thereby disengaging the eccentric 38 from the mold assembly and permitting the same to remain in locked position as above described.

Referring now to the mechanism utilized for performing the last above described operations, the reference numeral 50 denotes a shaft journaled in a laterally extending boss 51 formed upon the standard 1, said shaft being provided with a forwardly extending operating handle 52. Mounted upon the shaft 50 is an arm 53 provided with a roller 54, and also mounted upon said shaft and extending in an opposite direction with respect to the arm 53 is an arm 55 provided with a roller 56. The roller 54 is disposed directly beneath the rod 36 and the roller 56 is disposed directly above the rod 43, so that when the shaft 50 is moved in a contra-clockwise direction as by means of a downward thrust of the operating handle 52, the engagement of the roller 54 with the rod 36 will swing the latter upwardly to the position shown in Figure 2, while the engagement of the roller 56 with the rod 43 will swing the rod 43 downwardly to the position also shown in Figure 2, so that the rocking mechanism will be disengaged from the mold assembly and the latter locked in the position shown in Figure 2 by the engagement of the roller 47 with the walls of the recess 45. It is intended that this locking operation shall be effected at the termination of each vulcanizing operation, whereupon it is necessary to shut off the supply of steam to the interior of the vulcanized tube. This operation is effected by means of an arm 57 mounted upon the shaft 50, said arm being connected by means of a link 58 with an arm 59 mounted upon the stem 60 of the three-way valve 26. It will be seen, therefore, that the downward thrust of the lever 52 will move the valve member 61 of the three-way valve 26 from the position shown in Figure 4 of the drawing to the position shown in Figure 5 of the drawing.

It is intended that the valve member 31 shall normally occupy the position shown in Figure 1, the valve being open to the source of suction and shut off from the air pressure, so that when the valve member 61 is moved to the position shown in Figure 5, the interior of the vulcanized tube will be connected with the source of suction, whereby the steam present in the vulcanized tube will be quickly withdrawn therefrom. The valve member 31 may be operated manually as by means of a handle 62, so that when an unvulcanized tube is inserted in the mold, the valve member 31 may be moved to connect the interior of the tube through said valve and the three-way valve 26 with air from the pipe 32, whereby the same may be expanded within the mold. It will also be seen that if a vibratory movement be given the operating handle 62, the interior of the vulcanized tube may be alternately connected and disconnected with and from the source of vacuum and air pressure, which operation assists in separating the surface of the vulcanized tube from the vulcanizing surface of the mold. The use of the source of suction, however, is principally to withdraw the steam from the vulcanized tube, collapse it within the mold and withdraw therefrom any water of condensation that may be present therein subsequent to the vulcanizing operation.

In the embodiment of my invention above described, it will be seen that during the rotative movement of the shaft 39, the mold assembly will be rocked continuously at a uniform speed. I have found in practice, however, that it is desirable to hold the mold assembly stationary when rocked to its rearmost position, to permit water of condensation which may collect in the heating chambers 16 and 17 of the mold sections 6 and 7 respectively, to be discharged from said chambers. It will be seen that the exhaust pipes 19 and 21 are disposed at the rearmost portions of their respective mold sections, it being intended to rock the mold through an angle of approximately 30°, whereby when the mold assembly is tilted to its rearmost position, water of condensation will flow out by gravity through the discharge pipes 19 and 21.

Referring now to the embodiment of the invention shown in Figures 6 and 7 of the drawings, instead of providing an eccentric upon the drive shaft 39, I provide a wheel 63 provided with the cam slot 64 which is adapted to receive a roller 65 journaled upon a lever 66 pivotally mounted at 67 upon the bracket 68. The other end of the lever 66 has pivoted thereto at 69, the rod 70, which rod corresponds to the rod 36 in the first described embodiment. The rod 70 is provided with the recess 71 which engages with a roller 72 provided upon a pin 73 mounted upon an arm 74 extending inwardly from the lower mold section 6. The cam slot 64 is provided with a dwell 75 which is so co-related with the other parts of the mechanism that when the shaft 39 through the cam mechanism has rocked the mold assembly, the latter will be held stationary for an interval of time in such a position as to permit the water of condensation to be discharged from the heating chambers of the mold sections through the discharge pipes.

Mounted upon a circular boss 76 provided upon the standard 1, is a bell crank lever 77, having the arms 78, 79 and 80. The arm 78 is pivotally connected at 81 with a link 82 which in turn is pivotally connected at 83 with the rod 70. The shaft 50 is provided with a cam 84 which is adapted to engage with rollers 85 and 86 respectively journaled upon the outer ends of the arms 79 and 80. Mounted upon the shaft 50 is the arm 87 provided with a roller 88 adapted, when said arm 87 is swung downwardly, to engage with the locking rod 43 which is constructed in a manner identical with that shown in the first described embodiment of the invention. It will be seen, therefore, that when the handle 52 is moved downwardly, the cam 84 will swing the bell crank lever in a contraclockwise direction, disengage the operating rod 70 from the mold assembly and operatively connect the locking rod 43 with the recess 45.

It will be seen that in this embodiment of my invention, the mold assembly is normally slightly inclined toward the operator when the mold is in locked position. This facilitates the removal of the vulcanized tube from the lower section of the mold when the upper section is swung upwardly and it also facilitates the insertion of an unvulcanized tube in the lower section of the mold, preparatory to beginning another vulcanizing operation.

Having thus described these preferred embodiments of my invention, the operation thereof has been largely set forth in the description of the mechanism constituting said embodiments. It will be seen that when the mold assembly is operatively connected with its rocking mechanism the valve stem of the tube being vulcanized is also operatively connected with steam vulcanizing medium which is introduced into the interior of the tube being vulcanized through the valve stem 25. Should water of condensation form in the tube being vulcanized, the constant rocking of the mold assembly, will cause said water to be moved from place to place within the interior of the tube, whereby it will not be allowed to collect in any regional location therein, the result being that uniform vulcanization of the tube wall will be accomplished. Water of condensation will also be prevented from collecting in any part of the steam chambers and thus hindering vulcanization at such point. The operation of disconnecting the mold assembly from its rocking mechanism also shuts off the supply of steam from the tube, and automatically connects the latter with the source of suction, whereby the vulcanized tube will be quickly discharged of its steam and water of condensation. It will be understood that the rocking mechanism is so co-related with the driving mechanism, that the operator can manipulate the lever 52 when the mold assembly has been rocked to its extreme forward position.

It will accordingly be seen that I have provided mechanism well adapted to attain among others, all the ends and objects above pointed out, in an extremely simple manner, whereby in the vulcanization of a pneumatic tube or the like, utilizing steam as a vulcanizing medium, all parts thereof may be uniformly vulcanized.

As pointed out above, this invention is applicable to hollow articles other than inner tubes, such, for instance, as tire casings, by suitably changing the cross sectional shape of the interior of the mold members. The opening along the inner periphery of the casing could be sealed, if desired, as pointed out in my Patent 1,582,255, dated April 27, 1926. Accordingly, when I use the word tube in the claims, I do not intend to limit the same to an inner tube, but to also include other endless tubular articles such as tire casings.

When, in the claims, I refer to steam, I intend also to include any gas suitable for the purpose which is liable to condense so as to leave a condensate in a manner analogous to that in which steam condenses into water. It will also be understood that various changes may be resorted to in the form, construction and arrangement of the several parts, without departing from the spirit and scope of my invention; and hence I do not intend to be limited to the details herein shown and described except as they may be included in the claims.

Having thus described my invention, what I claim as new and desire to secure by Letters Patent, is:—

1. In an apparatus of the class described, in combination, a mold adapted to be heated to the vulcanizing temperature and adapted to receive a tube, to be vulcanized, means for introducing steam through said mold into said tube, means for moving said mold during the vulcanizing operation whereby to prevent water of condensation from collecting in any of the regional parts of said tube, and means for disconnecting said mold from its moving means and for locking it in a predetermined position after the vulcanizing operation has been accomplished.

2. In an apparatus of the class described, in combination, a steam heated mold divided into two sections provided with a vulcanizing chamber, a part of which is formed in each section, said vulcanizing chamber being adapted to receive a tube to be vulcanized, means for introducing steam into said tube and for maintaining steam pressure therein during the vulcanization, means for moving said mold during the period said tube is being vulcanized, means for disconnecting said mold from its moving means and for holding it in a stationary position when vulcanization upon said tube has been accomplished.

3. In an apparatus of the class described, in combination, a circular mold divided into two sections, pivotally mounted together and adapted to form between them a vulcanizing chamber adapted to receive a tube to be vulcanized, said mold sections being adapted to be independently steam heated to the vulcanizing temperature, means for introducing steam under pressure in the tube to be vulcanized while the latter is locked in said vulcanizing chamber, a support upon which said mold assembly is pivotally supported, means for rocking said mold assembly upon said pivotal support while the tube is being subjected to the vulcanizing operation, means for disconnecting the mold assembly from its rocking means subsequent to the performance of a vulcanizing operation upon the tube being vulcanized, and means for locking said mold assembly in a stationary position.

4. In an apparatus of the class described, in combination, a mold provided with one or more steam jackets, means for connecting said steam jackets with a source of steam under pressure, means for pivotally supporting said mold upon a horizontal axis, means for rocking said mold upon said axis, and means for momentarily holding said mold stationary during said rocking operation, whereby water of condensation may be discharged from said steam jackets.

5. In an apparatus of the class described, in combination, a pair of steam heated mold sections adapted to be placed in mating relation, so as to form a circular vulcanizing chamber between them, means for pivotally supporting said mold assembly upon a horizontal axis, said vulcanizing chamber being adapted to receive a pneumatic tube to be vulcanized, means for delivering steam to the tube to be vulcanized, means for delivering steam to said mold whereby the latter may be heated, means for rocking said mold upon its horizontal axis, and said last named means being adapted to hold the mold momentarily in a stationary position to permit the water of condensation to be discharged from the mold.

6. Apparatus of the character described comprising, a mold for an endless tube, means for injecting steam into the tube while in the mold for vulcanization purposes, and means for oscillating the mold during vulcanization.

7. Apparatus of the character described comprising an annular mold for an endless tube, means for injecting steam into the tube while in the mold for vulcanization purposes, and means for swinging the mold during vulcanization.

8. Apparatus of the character described comprising, an annular mold for an endless tube, means for injecting steam into the tube while in the mold for vulcanization purposes, and means for oscillating the mold during vulcanization in a direction at an angle to its plane as an annulus.

9. Apparatus of the character described comprising, an annular mold for an endless tube, means for injecting steam into the tube while in the mold for vulcanization purposes, means for mounting the mold on a pivotal support substantially parallel to its plane as an annulus, and means for moving the mold during vulcanization on said pivotal support.

10. Apparatus of the character described comprising, an annular mold for an endless tube, means for injecting steam into the tube while in the mold for vulcanization purposes, means for mounting the mold on a pivotal support substantially parallel to its plane as an annulus, and means for oscillating the mold on said pivotal support.

11. Apparatus of the character described comprising, a mold for an endless tube, means for injecting steam into the tube while in the mold for vulcanization purposes, means for oscillating the mold during vulcanization, means for locking the mold in a predetermined position, and common means for throwing the oscillating means out of operation and the locking means into operation.

12. Apparatus of the character described comprising, a mold for an endless tube, means for injecting steam into the tube while in the mold for vulcanization purposes, means for oscillating the mold during vulcanization, means for locking the mold in a predetermined position, and common means for throwing the oscillating means and the injecting means out of operation and the locking means into operation.

13. Apparatus of the character described comprising, a mold for an endless tube, means for injecting steam into the tube while in the mold for vulcanization purposes, suction means for exhausting the steam from the tube, means for oscillating the mold during vulcanization, means for locking the mold in a predetermined position, and common means for throwing the oscillating means and the injecting means out of operation and the locking means and the suction means into operation.

14. Apparatus of the character described comprising, a jacketed mold for an endless tube, means for injecting steam into the tube while in the mold for vulcanization purposes, means for supplying steam to the jacket, and means for oscillating the mold during vulcanization.

15. Apparatus of the character described comprising, an annular jacketed mold for an endless tube, means for injecting steam into the tube while in the mold for vulcanization purposes, means for supplying steam to the jacket, and means for swinging the mold during vulcanization.

16. Apparatus of the character described comprising, an annular jacketed mold for an endless tube, means for injecting steam into the tube while in the mold for vulcanization purposes, means for supplying steam to the jacket, and means for oscillating the mold during vulcanization in a direction at an angle to its plane as an annulus.

17. Apparatus of the character described comprising, an annular jacketed mold for an endless tube, means for injecting steam into the tube while in the mold for vulcanization purposes, means for supplying steam to the jacket, means for mounting the mold on a pivotal support substantially parallel to its plane as an annulus, and means for moving the mold during vulcanization on said pivotal support.

18. Apparatus of the character described comprising, an annular jacketed mold for an endless tube, means for injecting steam into the tube while in the mold for vulcanization purposes, means for supplying steam to the jacket, means for mounting the mold on a pivotal support substantially parallel to its plane as an annulus, and means for oscillating the mold on said pivotal support.

19. Apparatus of the character described comprising, a jacketed mold for an endless tube, means for injecting steam into the tube while in the mold for vulcanization purposes, means for supplying steam to the jacket, means for oscillating the mold during vulcanization, means for locking the mold in a predetermined position, and common means for throwing the oscillating means out of operation and the locking means into operation.

20. Apparatus of the character described comprising, a jacketed mold for an endless tube, means for injecting steam into the tube while in the mold for vulcanization purposes, means for supplying steam to the jacket, means for oscillating the mold during vulcanization, means for locking the mold in a predetermined position, and common means for throwing the oscillating means and the injecting means out of operation and the locking means into operation.

21. Apparatus of the character described comprising, a jacketed mold for an endless tube, means for injecting steam into the tube while in the mold for vulcanization purposes, means for supplying steam to the jacket, suction means for exhausting the steam from the tube, means for oscillating the mold during vulcanization, means for locking the mold in a predetermined position, and common means for throwing the oscillating means and the injecting means out of operation and the locking means and the suction means into operation.

22. Apparatus of the character described comprising, a mold for an endless tube, means for injecting steam into the tube while in the mold for vulcanization purposes, and means for imparting to the mold during vulcanization a movement of oscillation with intermittent dwells.

In testimony whereof, I affix my signature.

WALTER L. FAIRCHILD.